US011796202B2

United States Patent
Maruyama et al.

(10) Patent No.: US 11,796,202 B2
(45) Date of Patent: Oct. 24, 2023

(54) INTELLIGENT VENTILATION MONITORING, CONTROLS AND OPTIMIZATION

(71) Applicant: EnerAllies, Inc., Los Altos, CA (US)

(72) Inventors: Stephen C. Maruyama, Aptos, CA (US); Robert S. Keil, Los Altos, CA (US)

(73) Assignee: EnerAllies, Inc., Los Altos, CA (US)

( * ) Notice: Subject to any disclaimer, the term of this patent is extended or adjusted under 35 U.S.C. 154(b) by 0 days.

(21) Appl. No.: 17/525,754

(22) Filed: Nov. 12, 2021

(65) Prior Publication Data

US 2022/0154956 A1 May 19, 2022

Related U.S. Application Data

(60) Provisional application No. 63/114,823, filed on Nov. 17, 2020.

(51) Int. Cl.
*G05B 13/02* (2006.01)
*F24F 11/49* (2018.01)
(Continued)

(52) U.S. Cl.
CPC .............. *F24F 11/49* (2018.01); *F24F 11/52* (2018.01); *F24F 11/63* (2018.01);
(Continued)

(58) Field of Classification Search
CPC .. F24F 11/49; F24F 11/52; F24F 11/63; F24F 2110/10; F24F 2110/12; F24F 2110/20;
(Continued)

(56) References Cited

U.S. PATENT DOCUMENTS 5,464,369 A * 11/1995 Federspiel ............... F24F 11/30
236/94
6,718,213 B1 4/2004 Enberg
(Continued)

FOREIGN PATENT DOCUMENTS

CN 109812938 A * 5/2019
KR 10-2101023 B1 * 4/2020 .......... F24F 11/0001

OTHER PUBLICATIONS

Maniyama, U.S. Appl. No. 16/670,853, filed Oct. 31, 2019, Non-Final Rejection, dated Dec. 29, 2021.
(Continued)

*Primary Examiner* — Alicia M. Choi
(74) *Attorney, Agent, or Firm* — Hickman Becker Bingham Ledesma LLP

(57) ABSTRACT

Systems and methods for monitoring ventilation effects in one or more locations are described herein. In various embodiments, a server computer 120 tracks $CO_2$ level changes measured for a plurality of locations over a plurality of intervals of time over a plurality of days. When the server computer 120 receives data indicating performance of a ventilation action at a particular location and time, the system tracks changes in $CO_2$ levels to determine whether the device is operating optimally and, if the device is not operating optimally, sends a notification to a client computing device. Using tracked $CO_2$ level changes, the server computer 120 may identify ventilation actions to perform at different points in time and send instructions to a ventilation system which, when executed, cause performance of the ventilation actions.

19 Claims, 4 Drawing Sheets

(51) Int. Cl.
*F24F 11/63* (2018.01)
*F24F 11/52* (2018.01)
F24F 110/70 (2018.01)
F24F 110/64 (2018.01)
F24F 110/10 (2018.01)
F24F 110/12 (2018.01)
F24F 110/40 (2018.01)
F24F 110/30 (2018.01)
F24F 110/20 (2018.01)

(52) U.S. Cl.
CPC ...... *G05B 13/0265* (2013.01); *F24F 2110/10* (2018.01); *F24F 2110/12* (2018.01); *F24F 2110/20* (2018.01); *F24F 2110/30* (2018.01); *F24F 2110/40* (2018.01); *F24F 2110/64* (2018.01); *F24F 2110/70* (2018.01)

(58) Field of Classification Search
CPC ............... F24F 2110/30; F24F 2110/40; F24F 2110/64; F24F 2110/70; F24F 11/32; F24F 11/30; F24F 11/0001; F24F 11/46; G05B 13/0265; G05B 15/02; Y02B 30/70
See application file for complete search history.

(56) References Cited

U.S. PATENT DOCUMENTS

| | | |
|---|---|---|
| 8,571,922 B2 | 10/2013 | Zaloom |
| 9,298,196 B2 | 3/2016 | Matsuoka et al. |
| 9,322,565 B2 | 4/2016 | Weaver et al. |
| 9,471,946 B1 | 10/2016 | Keil et al. |
| 9,568,910 B2 | 2/2017 | Drees et al. |
| 10,002,184 B2 | 6/2018 | Matsuoka |
| 10,078,319 B2 | 9/2018 | Matsuoka et al. |
| 10,222,277 B2 | 3/2019 | Matsuoka et al. |
| 10,480,808 B2 | 11/2019 | Keil et al. |
| 11,060,745 B1 | 7/2021 | Johnson et al. |
| 11,609,004 B2 * | 3/2023 | Morgan .................. F24F 11/62 |
| 2008/0182506 A1 * | 7/2008 | Jackson .................. F24F 11/64 |
| | | 454/354 |
| 2010/0289643 A1 | 11/2010 | Trundle et al. |
| 2015/0032264 A1 | 1/2015 | Emmons et al. |
| 2015/0325096 A1 | 11/2015 | Hatch |
| 2016/0209059 A1 | 7/2016 | Castillo et al. |
| 2016/0334811 A1 | 11/2016 | Marten |
| 2017/0234562 A1 | 8/2017 | Ribbich et al. |
| 2019/0163215 A1 | 5/2019 | Cheng et al. |
| 2019/0285295 A1 * | 9/2019 | Tripathii ................. F24F 7/007 |
| 2020/0064005 A1 | 2/2020 | Keil |
| 2020/0240668 A1 * | 7/2020 | Bassa .................. G05B 13/028 |
| 2021/0018198 A1 * | 1/2021 | Alanqar ................. F24F 11/64 |
| 2021/0018206 A1 * | 1/2021 | Barooah ................ F24F 11/80 |
| 2021/0389005 A1 | 12/2021 | Maruyama |
| 2022/0011731 A1 * | 1/2022 | Risbeck ................. F24F 11/52 |
| 2022/0146128 A1 | 5/2022 | Bassa .................. G05B 13/028 |
| 2022/0154956 A1 * | 5/2022 | Maruyama ............... F24F 11/52 |

OTHER PUBLICATIONS

Maruyama, U.S. Appl. No. 16/773,803, filed Jan. 27, 2020, Notice of Allowance and Fees Due, dated Dec. 21, 2022.

* cited by examiner

INTELLIGENT VENTILATION MONITORING, CONTROLS AND OPTIMIZATION

CROSS-REFERENCE TO RELATED APPLICATIONS; BENEFIT CLAIM

This application claims the benefit of Provisional Appln. 63/114,823, filed Nov. 17, 2020, the entire contents of which is hereby incorporated by reference as if fully set forth herein, under 35 U.S.C. § 119(e). The applicant(s) hereby rescind any disclaimer of claim scope in the parent application(s) or the prosecution history thereof and advise the USPTO that the claims in this application may be broader than any claim in the parent application(s). This application is also related to the following, the entire contents of each of which is hereby incorporated by reference as if fully set forth herein:

U.S. application Ser. No. 17/327,444, titled "FORECAST-BASED AUTOMATIC SCHEDULING OF A DISTRIBUTED NETWORK OF THERMOSTATS WITH LEARNED ADJUSTMENT", filed May 21, 2021;

U.S. application Ser. No. 16/670,853, titled "ENERGY MANAGEMENT COMPUTER SYSTEM", filed Oct. 31, 2019; and U.S. application Ser. No. 16/773,803, titled "ENERGY EFFICIENCY AND COMFORT OPTIMIZATION THROUGH EXTREME WEATHER ADAPTIVITY AND AI", filed Jan. 27, 2020.

FIELD OF THE DISCLOSURE

The present disclosure relates to ventilation management computer programs, computer systems, and computer-assisted solutions. The disclosure relates more specifically to a networked, cloud-based ventilation management computer system that provides for centralized management and control of multiple ventilation devices located at a plurality of sites, and error detection for ventilation devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modernly, there is an increased need for well-ventilated locations to achieve what can be referred to as "healthy buildings." While ventilation recommendations have existed for a long time for the purposes of energy management or keeping air in a room from having degraded air quality, recent events have shown that previous ventilation settings and rules can be insufficient when a new need for ventilation occurs. Diseases such as the severe acute respiratory syndrome coronavirus 2 (SARS-CoV-2), also known as COVID-19, have illuminated a need for ventilation that can be adapted to different situations.

Many states and counties have instituted minimum ventilation requirements for indoor facilities. Ventilation using outside air is necessary to reduce the concentration of the virus contaminant, which reduces the risk of transmission of the virus when multiple people share an enclosed space. Thus, businesses, schools, and other indoor facilities managers have found an increasing need to ensure ventilation systems are working properly.

Setting up a ventilation system on its own is not an immediate solution to the problem. A ventilation system may be useless if not used when it is necessary, or is not working properly. Alternatively, a ventilation system that is constantly being used at its maximum capacity many times represents a waste of energy, and such usage may have many drawbacks. For example, over-use of a ventilation system may negatively impact internal temperatures, causing rooms to become too cold or too hot depending on outside temperature. Furthermore, over-use of a ventilation system can cause the indoor space to have overly-high or overly-low humidity levels, which can create other indoor health problems (e.g., mold).

As a solution, some ventilation devices are paired with carbon dioxide ($CO_2$) sensors which measure the amount of $CO_2$ in a room in parts per million (ppm). Systems may be set up to increase ventilation when the amount of $CO_2$ in a room reaches a threshold value. For instance, a ventilation device may open a vent to 20% when the concentration of $CO_2$ exceeds an 800 ppm threshold.

However, this fixed threshold-based solution, while relatively easy to implement, has its own shortcomings. For example, the needs of a given location may vary greatly from the needs of other locations, even when in similar geographical areas. A ventilation system servicing an auditorium is going to have a very different effect than a ventilation system in a small classroom. Even spaces of the same size may differ in their responses to ventilation, e.g., based on a location of a ventilation device within the space, configuration of the space, geographic location of the space, disposition of the space within a larger building, average temperature of the space, a number of people occupying the space, etc. Without an understanding of how ventilation affects a particular location, a fixed threshold-based solution implemented at the location is likely to under-ventilate or over-ventilate the space.

A second problem with a fixed threshold-based solution is that it fails to take into account the circumstances of a particular $CO_2$ level in a location. Even if differences between locations are understood and separate thresholds are set for each location, a fixed threshold-based solution will fail to account for various situations which may need greater amounts of ventilation. For instance, effects of ventilation in a particular location may be highly dependent on the outside air quality. Thus, at a particular location with poor external air quality, a same ventilation action taken at a same $CO_2$ ppm level may have less impact on the $CO_2$ level than when taken at a different location with better external air quality. Ventilation effects may additionally be dependent on other factors, such as temperature, barometric pressure, humidity, or dew point. Additionally, ventilation has varying effect based on the rate of change of $CO_2$ levels. For example, when more people occupy a space, the $CO_2$ levels will rise more rapidly than when less people occupy the space, and ventilation will have a lesser effect than when the location has a slower rise in $CO_2$ levels.

A third problem with a fixed threshold-based solution is that it depends on the ventilation device operating properly. If the ventilation device is not wired properly, a filter is not correctly installed, a ventilation vent is blocked, or any other issue occurs that reduces the effectiveness of the ventilation device, a threshold-based solution will fail to properly ventilate a location. Additionally, a user may not determine that a ventilation device has been failing to properly ventilate a particular location until it after the $CO_2$ ppm, or another dangerous airborne substance, rises to dangerous levels. For example, if a ventilation system fails to properly ventilate a target space that is occupied by an infectious individual, a facilities manager may not understand that a problem exists before other individuals in the space are infected.

Systems and methods are provided herein to address the above-identified issues.

SUMMARY

The appended claims may serve as a summary of the disclosure.

DETAILED DESCRIPTION

Figure 1:
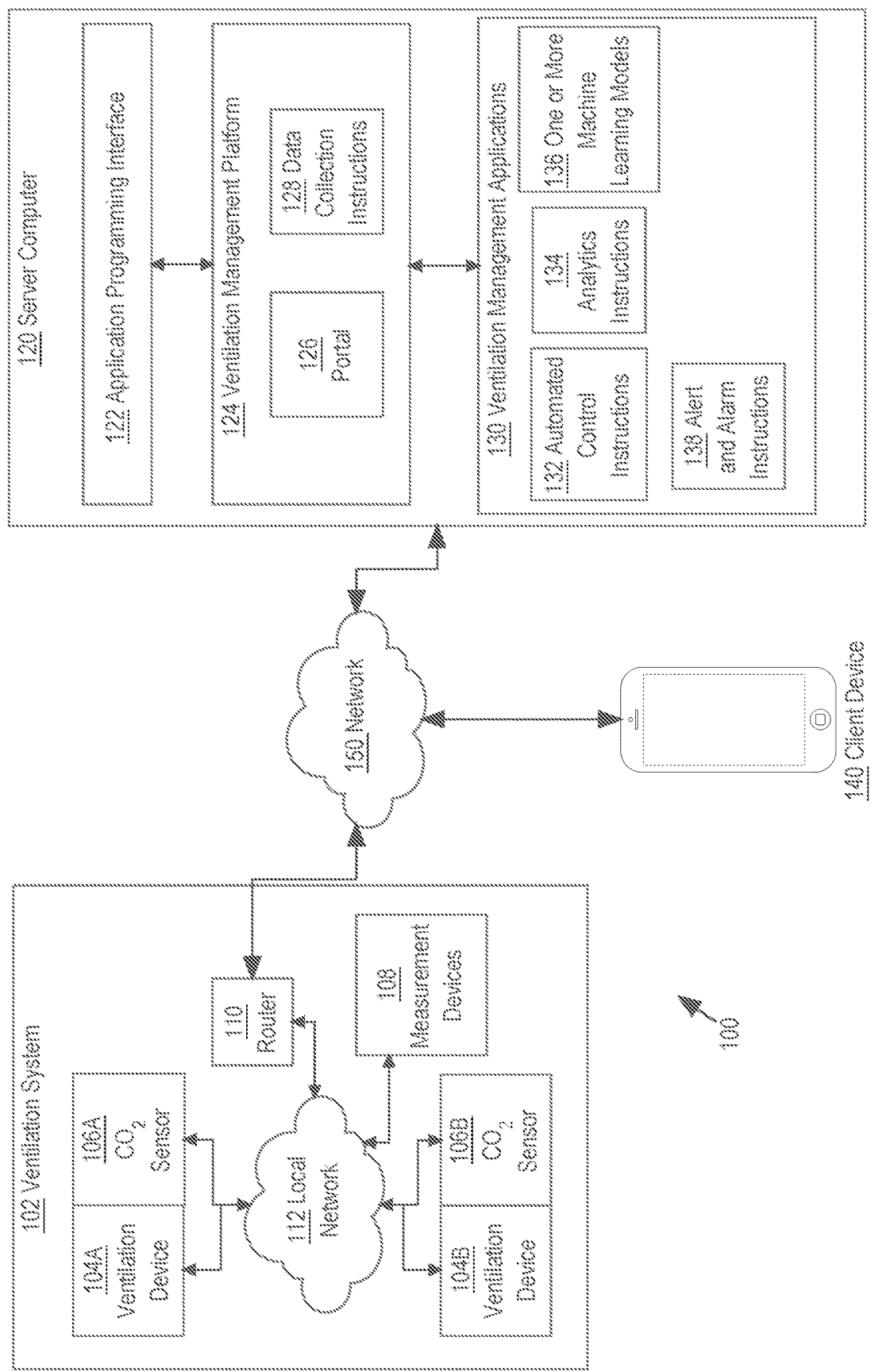
FIG. 1 is a block diagram that depicts an overview of a ventilation system.

In the following description, for the purposes of explanation, numerous specific details are set forth in order to provide a thorough understanding of the present disclosure. It will be apparent, however, that the embodiments may be practiced without these specific details. In other instances, well-known structures and devices are shown in block diagram form in order to avoid unnecessarily obscuring the present disclosure.

Embodiments are described herein according to the following outline:

1.0 General Overview
2.0 System Overview
  2.1 Machine Learning Models
3.0 Ventilation Operations
  3.1 Machine Learning Based Configuration of Ventilation Devices
  3.2 Baseline Monitoring
  3.3 Measurement Display
  3.4 Ventilation Problem Detection
    3.4.1 Thresholds
    3.4.2 Machine Learning Implementations
    3.4.3 Notifications and Actions
4.0 Ventilation Optimization
  4.1 Location-Specific Recommendations
  4.2 Ventilation Configuration
  4.3 Ventilation Balancing
  4.4 Ventilation Installation
  4.5 Pre-Conditioning
    4.5.1 Machine Learning for Pre-Conditioning
  4.6 Machine-Learning Based Ventilation Action Selection
5.0 Implementation Mechanisms—Hardware Overview 1.0 General Overview Systems and methods for improved ventilation management systems are described herein. In various embodiments, a server computer receives one or more environmental metric values that represent one or more environmental conditions—such as carbon dioxide ($CO_2$) levels, carbon monoxide levels, inside or outside air temperature, internal air speed, humidity, particulate levels, barometric pressure, or dew point—from one or more sensors at one or more locations. The server computer additionally receives ventilation information for and/or one or more non-detected environmental values such as ventilation levels (e.g., percentage of vent opening), ventilation device fan speed, a ventilation or conditioning action that was taken, a thermostat target temperature, a day of the week, date, population density of the target space (e.g., the average number of people per square foot of the target space), conditioning device settings, ventilation device settings, scheduled events, time of day, timestamp, etc. As used herein, the term "environmental metrics" may be used to refer to environmental metrics detected via a sensor within a target space and/or to ventilation information as described above.

Using the received information, the system is able to track changes in environmental metric values and the effects of implementation of ventilation settings on the environmental metric values. This information can be provided to a client device, thereby providing insight into location-specific effects of ventilation settings at different locations. The information can additionally be used to detect decreased effectiveness of ventilation devices. The information can additionally be used to generate ventilation recommendations and/or to automatically optimize ventilation devices to control one or more environmental conditions (such as $CO_2$ levels), measured by the environmental metric values, in a way that minimizes energy costs or reduces the effect of ventilation on other environmental conditions (such as air temperature fluctuations).

In various embodiments, a ventilation device monitoring method comprises detecting that a ventilation action has been performed by a ventilation device at a particular location at a particular time; tracking a change in an environmental metric measured at the particular location after the ventilation action has been performed by the ventilation device; wherein the environmental metric is based on one or more of: a carbon dioxide ($CO_2$) level, inside air temperature (IAT), outside air temperature (OAT), humidity, particulate levels, barometric pressure, indoor air pressure, ventilation device fan speed, ventilation opening percentage, air speed, date, day of the week, scheduled events, population levels time of day, or dew point; determining from the change in the environmental metric at the particular location that the ventilation device is not performing optimally based on one or more optimization criteria; and in response to determining that the ventilation device is not performing optimally, sending a notification to a client computing device. Said detecting that a ventilation action has been performed may be based on receiving information, over a network at a server computer, that the ventilation action has been performed.

Herein, references to "air temperature" may refer to one or both of IAT and OAT, unless otherwise specified. Furthermore, references to "environmental metrics" may refer to any combination of one or more environmental metrics, unless otherwise specified.

In various embodiments, a ventilation optimization method comprises tracking $CO_2$ level changes measured for a plurality of locations over a plurality of intervals of time; based on the tracked $CO_2$ level changes measured for the plurality of locations, determining a ventilation action to perform at a particular location, of the plurality of locations, at a particular future time; and sending one or more instructions to a ventilation device at the particular location that, when executed, cause the ventilation device to perform the ventilation action at the particular future time.

2.0 System Overview

Various embodiments implement a ventilation management system based on a distributed computer-based architecture that includes networked ventilation devices and environmental condition sensors located at a plurality of sites and a collection of ventilation management computer program applications and modules implemented by a centralized server computer 120. In various embodiments, one or more of the ventilation management program applications and modules are responsible for facilitating customer access to the ventilation management system and collecting, storing, and analyzing ventilation management data collected from the devices at the plurality of sites. In various embodiments, the ventilation management system is adaptable to a wide variety of ventilation usage requirements and enables customers accessing the system to configure ventilation management devices using scheduling templates, to define and customize ventilation actions and effects for optimization and data analysis purposes, and to request and display various statistical views of ventilation data.

In this context, ventilation management devices are devices that are configured to control and/or monitor one or more ventilation appliances such as, for example, heating, ventilation, and air conditioning (HVAC) units; additional examples include Economizers, and such devices might work in conjunction with Demand Control Ventilation (DCV) systems. In various embodiments, the centralized server receives environmental metric values from other sensor devices (or "measurement devices"), such as $CO_2$ detectors, thermometers, barometers, hygrometers, or any combination thereof. In various embodiments, the measurement devices are configured to collect data relating to $CO_2$ levels, ventilation levels, energy usage, temperature, barometric pressure, humidity, particulate (such as smoke) levels, or other environmental metrics and to send the data to a centralized server computer 120.

In various embodiments, one or more of the ventilation management devices may comprise a programmable wireless communications subsystem that enables the devices to communicate with the centralized server computer over one or more wireless or wireline communications networks. In various embodiments, the programmable wireless communications subsystem is implemented using the Wi-Fi wireless communication standard. The use of the Wi-Fi wireless standard in ventilation devices provides numerous benefits such as, for example, enabling the devices to wirelessly connect to the Internet without a dedicated gateway device. These and other factors may significantly decrease the costs of system implementation.

In various embodiments, a centralized server computer is coupled to an internetwork or wide area network and is configured to provide a World Wide Web-based management interface, or portal, that enables users to securely access and configure various aspects of the system. For example, users may interact with the portal to configure ventilation settings for one or more managed locations (such as preferred or maximum $CO_2$ levels and or target temperature levels or rules), create ventilation schedules. Users may also use the portal to request various statistical views of current environmental metric values, historical environmental metric values, changes in environmental metric values, etc. The server computer is configured so that, based on various user profiles, the portal may securely control application program and stored ventilation data access to various users within a customer company, to third-party users that may have a business relation with one or more customers, and to users associated with different customers, who may be competitors. In various embodiments, the server computer may include an application programming interface (API) that enables third-party users to access controlled views of ventilation data.

FIG. 1 is a block diagram that depicts an overview of an example ventilation control system 100. Ventilation control system 100 includes a server computer 120 which monitors and/or controls ventilation devices and/or environmental metric values for one or more sites. In this context, a site generally refers to a building or series of buildings that are located in a geographic location. While FIG. 1 depicts a ventilation system 102, of example ventilation control system 100, comprising a single site, a ventilation control system may control ventilation at multiple sites at multiple geographic locations, e.g., where the various sites are controlled or managed by a single entity, such as a school or corporation. In various embodiments, ventilation system 102 is coupled through a router 110 to a network 150, which may represent the Internet or a local area network, and through network 150 to server computer 120. According to various embodiments, ventilation system 102 further comprises one or more conditioning devices, which may be monitored or controlled by the ventilation control system. According to various embodiments, ventilation actions described herein may also include conditioning actions, such as changing a target temperature of a thermostat that controls one or more conditioning devices.

Example ventilation system 102 includes two ventilation device 104A and 104B communicatively coupled to a wireless local network 112 that has connectivity to network 150. Each of ventilation devices 104A and 104B may be located in a different area/space within the ventilation system 102 at the example site. For example, ventilation device 104A is located in a classroom while ventilation device 104B is located in a cafeteria. Each of the ventilation devices 104A and 104B communicate over wireless local network 112 using wireless connections that, for example, use the Wi-Fi communication standard. For example, router 110 may comprise a wireless access point that facilitates communication between any wireless ventilation device and network 150. In some embodiments router 110 may be the same router that is used for communication with other computer devices at the site, such as point of sale terminals, inventory computers, or special-purpose computers; in other words, embodiments of the systems and solutions described herein do not require a dedicated router, but can use available bandwidth of a router that is already installed at the site for other purposes.

In various embodiments, one or more ventilation management devices of ventilation control system 100 may be configured to communicate directly with one or more ventilation devices and/or measurement devices. For example, one or more of ventilation devices 104A or 104B may be configured to communicate directly with other devices using the Wi-Fi Direct protocol or other similar peer-to-peer communication standard. While certain embodiments are described in connection with wireless communication, wired communication or a combination may be used in other embodiments. Direct communication between devices may enable the addition of ventilation devices at more locations resulting in more detailed data collection. The ventilation management device may comprise a computing device configured to adjust parameters of a ventilation device or cause performance of a ventilation action, such as in response to readings from a corresponding $CO_2$ sensor or other detector.

In the example of FIG. 1, ventilation devices 104A and 104B are communicatively coupled to $CO_2$ sensors 106A and 106B, respectively. For purposes of discussion herein, $CO_2$ levels are used as a non-limiting example of an environmental condition tracked and utilized by a ventilation control system. The connections between ventilation devices and sensors and/or sensors and local network 112 may comprise wired connections and/or wireless connections. $CO_2$ sensors 106A and 106B may be positioned in locations affected by ventilation devices 104A and 104B, respectively. For example, ventilation device 104A provides ventilation for a particular room in a hospital, and accordingly, $CO_2$ sensor 106A is located in the particular room.

In various embodiments, ventilation system 102 comprises other measurement devices 108. Measurement devices may comprise devices configured to measure temperature, humidity, particulate levels, barometric pressure, or provide other environmental metrics relevant to ventilation practices. The other measurement devices 108 may include devices in a same or nearby location as ventilation devices 104A and 104B. For example, a thermometer outside of a building containing a ventilation device may provide outside temperature measurements while a thermometer co-located with the ventilation device may provide temperature measurements inside the room. Other example devices include barometers, hygrometers, smoke detectors, or any other measurement device.

Network 150 may comprise a plurality of public internetworks providing connectivity between ventilation system 102 and server computer 120. In various embodiments, network 150 may comprise a private point-to-point connection of a site to the server computer 120. For example, a client computing device located at the site of ventilation system 102 could use the public Internet to connect to server computer 120 for system configuration and reporting purposes, but a private point-to-point connection may be provided for the collection of data from ventilation devices 104A and 104B. For example, a point-to-point connection could be implemented using an Internet Protocol Security (IPsec) network tunnel or other mechanism providing a secure connection over which collected data may be transmitted. In various embodiments, the secure connection may be made compliant with the Payment Card Industry (PCI) security standards such that the collected data may be transmitted over the same network elements and through network firewalls used by various sites to securely transmit credit cardholder information.

Server computer 120 comprises a ventilation management platform and a collection of ventilation management applications and modules, each of which is detailed in other sections below. In general, the ventilation management applications and modules of server computer 120 are configured to perform measurement device data collection, enable customers to access and manage the ventilation management system, and provide analysis of collected measurement data.

A ventilation system that is hard-coded to perform ventilation actions given particular detected environmental metrics is difficult to monitor. For example, it is difficult to determine whether such a system was properly set up, or even if an attempt was made to customize the parameters of the hard-coded system during system initialization. In contrast, using a server device, such as server device 120, to automatically set up and monitor a ventilation system provides users with access to important metrics, including the effectiveness of the various components of the system. Such information is difficult to obtain in a hard-coded system, which generally requires a technician to come to the site to manually diagnose any problems. Because many issues with ventilation settings cause only small problems (which can add up quickly), users generally avoid bringing a technician on-site until a serious problem develops, which allows any number of small issues to persist, draining the resources of the user. Thus, embodiments described herein facilitate optimal functionality of a ventilation system to be achieved with as few energy resources as possible, while increasing the likelihood of maintaining quality and comfort levels required by the user and providing transparency regarding system functionality to the user.

In various embodiments, server computer 120 comprises an application programming interface (API) 122, ventilation management platform 124, and ventilation management applications 130. The modules depicted in FIG. 1 are provided as examples, and server computer 120 may comprise any number of additional modules include logging, system administration, and other modules or sub-modules.

In various embodiments, ventilation management platform 124 and ventilation management applications 130 interface with ventilation system 102 and/or a client device 140 using API 122 that implements ventilation management functions. API 122 may provide controlled third-party access to various statistical views, collected ventilation and measurement data, device templates, and other information. In this manner, data collected and stored in server computer 120 may be provided as a data asset to various third parties including industry analysts, ventilation manufacturers, utility providers, and others. API 122 may additionally allow server computer 120 to control ventilation devices in ventilation system 102 and/or obtain analytics from ventilation and/or measurement devices.

Ventilation management platform 124 comprises a customer portal 126 and data collection instructions 128. The portal 126 represents a graphical user interface (e.g., displayed on a display device that is associated with server computer 120 or with client device 140) and associated operating programs. The server computer 120 may be configured to generate graphical user interface information for, and cause display of, a management interface comprising one or more informational dashboards, configuration pages, and other interfaces that facilitate user interaction with the ventilation system, such as analytics and reports, alerts and alarms, configuration options, database options (e.g., for customer, group, site, and/or device configuration), schedules, user access management, etc. In various embodiments, portal 126 may be accessed using a computer such as client device 140 over a network, e.g., based on client device 140 requesting information for portal 126 via network 150 and, in response, server computer 120 sending information for a graphical user interface (GUI) that, when processed by client device 140, causes display of a GUI for portal 126 at a display device associated with client device 140. In this example, a user at client device 140 interacts with portal 126 via the displayed GUI.

Client device 140 may be any computing device capable of requesting services over a network such as, for example, personal computers, workstations, laptop computers, netbook computers, smartphones, and tablet computers. As an example, client device 140 may comprise a browser that can access HTML documents generated by portal 126. In various embodiments, client device 140 may be integrated into ventilation system 102.

In various embodiments, portal 126 may generate GUI displays that are customized for particular devices. For example, in response to requests for similar information, portal 126 may generate one display in response to detecting that client device 140 is a smartphone, and a second display in response to detecting that client device 140 is a personal computer. In various embodiments, the generation of informational dashboards, configuration pages, and other displays may be customized, e.g., using Responsive Web Design, for more effective display depending on various characteristics of the client device including, for example, screen size and resolution, processing power, presence of a touch user interface, and connection bandwidth.

In various embodiments, portal 126 may control access to ventilation control system 100 based on user access credentials supplied by a user accessing portal 126. In various embodiments, each authorized user may be associated with a user profile that identifies the user's access level within the system. In various embodiments, a user's access level may include defining particular databases that the user may access, one or more specific sites or locations that the user is authorized to view and/or configure, and/or whether the user has permission to modify the data or has read-only access.

In various embodiments, a user accessing portal 126 may define and configure various aspects of ventilation system 102 in accordance with the user's profile and corresponding access levels. For example, a user may use portal 126 to configure one or more data collection configurations, scheduling templates, statistical views, and other elements, as further described in other sections.

Data collection instructions 128 comprise computer-readable instructions that, when executed by one or more processers of server computer 120 cause server computer 120 to collect and store ventilation information (such as ventilation actions taken, ventilation fan speed, etc.) and/or other environmental metrics. Data collection instructions 128 may be configured to cause server computer 120 to periodically request environmental metrics from different measurement devices and/or to collect environmental metrics in response to one or more triggers. For example, in response to receiving information indicating that a ventilation action has been performed, the server computer 120 may request environmental metrics from measurement devices 108 and/or $CO_2$ sensors 106. As a further example, the server computer 120 automatically gathers environmental metrics from measurement devices 108 and/or $CO_2$ sensors 106 at particular time intervals, e.g., that are indicated in user configuration data. Data collection instructions 128, when executed, may further cause server computer 120 to store received measurement data in a database or other datastore in a structured format such that ventilation levels at a particular point in time can be associated with $CO_2$ levels, or one or more other environmental metrics, at the particular point in time.

Server computer 120 may further be configured to set rules for data collection that are executed by ventilation system 102. For example, server computer 120 may configure ventilation system 102 to send environmental metrics to server computer 120 at specific times in a day, at specific intervals, and/or in response to one or more events, such as a ventilation action being performed, a specific $CO_2$ level being reached, or other thresholds relating to ventilation being surpassed.

Server computer 120 may further comprise ventilation management applications 130 that provide centralized configuration and control of ventilation systems across any number of locations. Ventilation management applications 130 may include automated control instructions 132, analytics instructions 134, one or more machine learning models 136, and/or alert and alarm instructions 138.

Automated control instructions 132 comprise computer-readable instructions that, when executed by one or more processors, cause server computer 120 to control one or more ventilation devices of ventilation system 102. For example, server computer 120 sends instructions to ventilation system 102 that, when executed, cause a ventilation device to increase ventilation or decrease ventilation at a particular location.

Automated control instructions 132 may include rules that specify when to perform one or more ventilation actions. These rules may be user-configured and/or determined by the server computer 120 to achieve a particular result. For example, a user-configured rule may indicate times during the day to increase ventilation and/or times during the day to decrease ventilation. In contrast, a rule may be generated by server computer 120 to achieve a result of keeping a level of $CO_2$ under a threshold value, such as 900 parts per million (ppm). The server computer 120 may determine a rule for a particular location based on measurement data from the particular location, such as effects of different levels of ventilation or dependence/correlations of ventilation effects on $CO_2$ levels of one or more other environmental metrics such as pressure, temperature, dew point, or other values at the location. In various embodiments, a rule may be configured to balance one or more competing results, such as maximizing ventilation while minimizing changes in temperature due to ventilation. For example, each site, location, and/or device may be associated with a comfort profile in user configuration data. Such comfort profiles contain one or more comfort or quality ranges for one or more environmental matrix values, such as: $CO_2$ level thresholds; Humidity Comfort Range 0-55; IAT: 65-76° F.; etc. Such comfort profiles may further contain how the one or more environmental matrix values are managed, such as: Humidity: primarily HVAC-Air Conditioning (AC); IAT: HVAC-AC and ventilation control; $CO_2$ level PPM: ventilation control; etc.

Analytics instructions 134 comprise computer-readable instructions that, when executed by one or more processors, cause server computer 120 to generate analytics based on received ventilation information, $CO_2$ levels, and/or other environmental metrics. The analytics may include changes in environmental metrics in response to ventilation actions and/or other factors, such as other environmental metrics, e.g., changes in $CO_2$ level corresponding to one or more of initial $CO_2$ level, or current temperature, humidity, particulate levels, barometric pressure, dew point, or other inputs. Analytics instructions 134, when executed, may further cause server computer 120 to generate a graphical display to display ventilation analytics. For example, server computer 120 may generate a display depicting average $CO_2$ levels over a plurality of days for different times during the day. Other analytics displays may directly display received information. For example, a display may depict $CO_2$ levels at different times during a day along with data indicating when a ventilation action occurred. Comparative displays may additionally show differences in $CO_2$ levels and ventilation reactions in different locations, e.g., in connection with one or more additional environmental metrics for the different locations. Example displays are described further in other sections herein.

Alert and alarm instructions 138, when executed, may further cause server computer 120 to generate one or more alerts and/or alarms, e.g., for display within a GUI described herein, and/or for communication with a user via one or more alternative or additional communication methods such as email, telephonic text message, automated telephone message, voice mail, a push notification at client device 140, an alert via an application or GUI displayed at client device 140, etc. For example, server computer 120 may generate an alert that particular configuration information that is managed by a particular user has been adjusted, or that one or more environmental metrics for a given location have exceeded one or more comfort ranges in an applicable comfort profile. As another example, server computer 120 may generate an alarm based on satisfaction of one or more alarm criteria, such as $CO_2$ levels at one or more locations exceeding an alarm threshold, detecting reduced functionality of one or more ventilation devices 104, detection of an impaired environmental metric sensor, information indicating that one or more ventilation devices have been turned off during business hours, etc.

2.1 Machine Learning Models

According to various embodiments, server device 120 maintains one or more machine learning models 136, which are used to set up ventilation control system 100, to optimize the functionality of the system, e.g., at system initialization, and/or to identify devices that are functioning sub-optimally. For example, machine learning models 136 may be pre-trained to provide predictions for a ventilation system using ventilation data from a variety of sources (such as from other facilities being managed using machine learning). Ventilation data used to train machine learning models 136 may include historical ventilation or conditioning actions (such as changing a vent opening, changing a fan speed, and/or increasing or decreasing a target temperature for a thermostat) taken by ventilation devices or conditioning devices. Ventilation data further includes one or more environmental metrics such as $CO_2$ levels, ventilation levels (e.g., percentage of vent openings), OAT, IAT, barometric pressure, humidity, date, time of day, particulate levels, space population, and/or dew point, etc.

The pre-trained model may be used to predict current or pre-conditioning ventilation actions for the target spaces to keep one or more target environmental metrics within a comfort or quality range/thresholds, or may be used to predict whether ventilation or conditioning devices are functioning optimally. Server device 120 further trains the machine learning models using historical ventilation data recorded for system 100, including ventilation actions taken by system 100 and detected environmental metrics, to customize the pre-trained machine learning models for system 100.

Using machine learning to optimize system 100, rather than manually setting up and adjusting the system, reduces the time required to set up the system. This is especially true when compared with a hardware-based system that requires an on-site technician to manually configure the system hardware. Manually configuring and maintaining an automated ventilation system requires a high level of expertise, and the manual process is prone to error. Using machine learning to set up and optimize functionality of the system reduces the amount of expertise required and reduces the likelihood of user error. This ensures that the ventilation system runs as efficiently as possible from system installation through its lifespan, which reduces the energy resources and man-hours required to run the system and increases the overall effectiveness of the system.

3.0 Ventilation Operations

Figure 2:
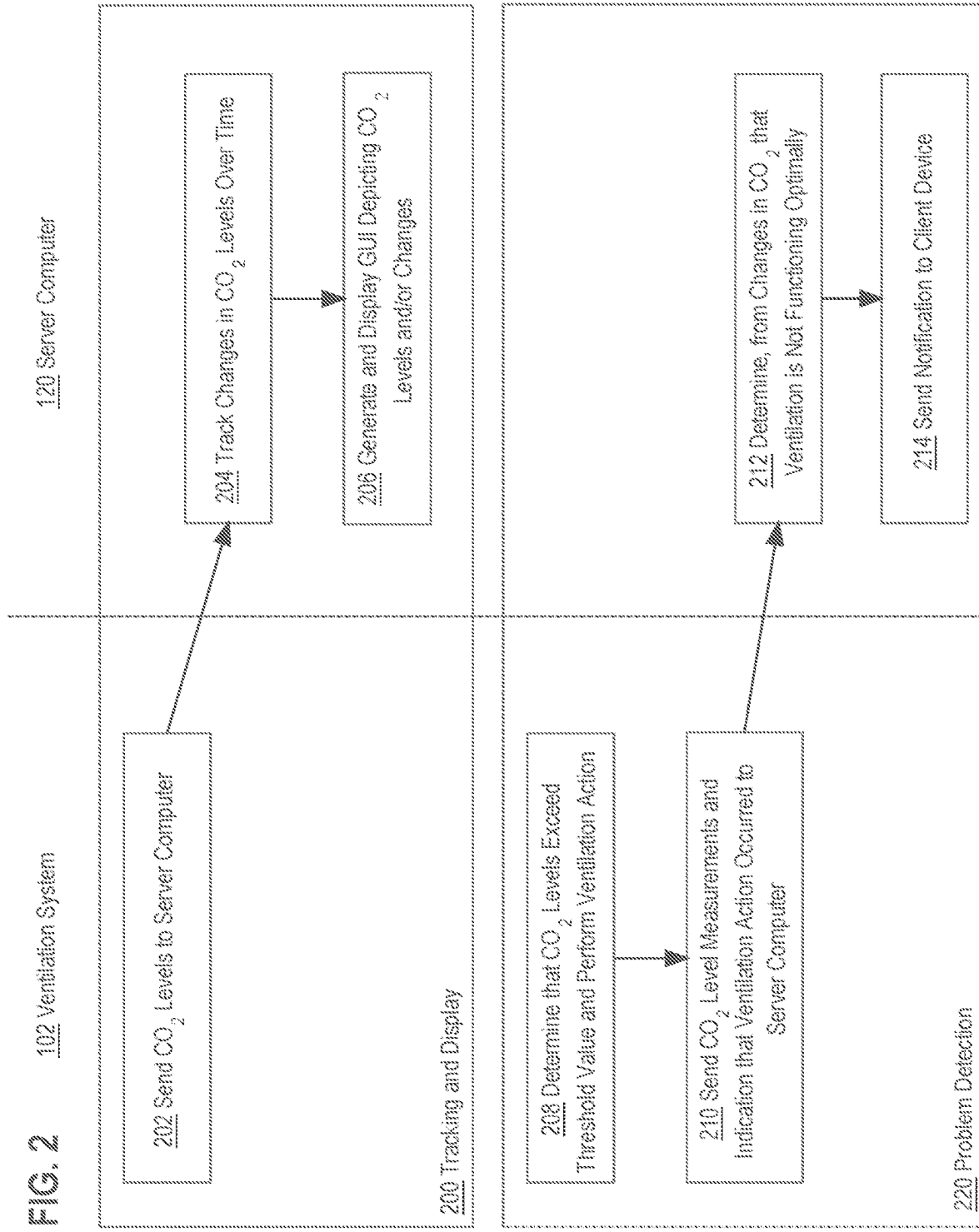
FIG. 2 depicts example processes for tracking changes in carbon dioxide levels and determining whether a ventilation device is functioning optimally.

FIG. 2 depicts example processes for tracking changes in environmental metrics, using carbon dioxide levels as an example environmental metric, and using the tracked data to determine whether a ventilation device is functioning optimally. FIG. 2 is intended to disclose an algorithm, plan or outline that can be used to implement one or more computer programs or other software elements that, when executed, cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

3.1 Machine Learning Based Configuration of Ventilation Devices

Machine learning may be used to predict an optimal configuration of a ventilation device. Using predicted parameters to configure a newly-installed ventilation system reduces the amount of time required to configure the system and provides configuration parameters that are likely to be optimal for system functionality. For example, a machine learning model 136 may be trained using training data that indicates one or more environmental metrics in connection with a historical ventilation action, such as population density, $CO_2$ levels, IAT, OAT, target thermostat temperature, the type of ventilation action taken, the settings used for the ventilation action, the settings used for the ventilation device that performed the action, and changes in one or more environmental metrics after the ventilation action. Such a machine learning model may be configured to predict the settings for a ventilation device that should be used based on the current values of the one or more environmental metrics used to train the model.

3.2 Baseline Monitoring

Process 200 comprises a process for tracking environmental metrics, e.g., $CO_2$ levels, and generating displays relating to the tracked environmental metrics. At step 202, ventilation system 102 sends data to server computer 120 identifying $CO_2$ levels. For example, ventilation system 102 is configured to capture measurements of $CO_2$ levels in one or more locations, such as through a $CO_2$ sensors 106A and 106B. The ventilation system 102 may be configured to send $CO_2$ level measurements in a continuous stream to server computer 120, periodically, such as every minute to every ten minutes, and/or in response to one or more triggers, such as a request for an environmental metric update or detection that a threshold $CO_2$ level has been reached and/or surpassed. Such triggers may be based on any environmental metric, such as $CO_2$ levels, IAT, OAT, humidity, dew point, current ventilation opening percentage, etc.

Ventilation system 102 may additionally send ventilation data and/or multiple environmental metrics to server computer 120. According to various embodiments, ventilation data may comprise one or more indicators of a level of ventilation of one or more ventilation devices in one or more locations, such as ventilation measurements (e.g., air speed being produced by a ventilation device) and/or ventilation settings (e.g., a fan speed setting of a ventilation device, percentage of vent opening, etc. For example, ventilation levels may include an amount a vent is open, such as twenty percent open, a fan speed, measured air speed, or any other ventilation metric. The ventilation data may indicate when ventilation levels changed in the one or more locations, e.g., based on ventilation actions. For instance, the ventilation data may indicate that at 2:00 pm, a particular ventilation device increased a vent opening from 25% to 50%.

Ventilation changes may be tied to $CO_2$ levels. For example, ventilation system 102 may be configured to change ventilation levels for ventilation devices 104 in response to particular $CO_2$ levels being reached. For example, ventilation system 102 may be configured to open a vent to 20% when $CO_2$ levels reach 400 ppm, 40% when $CO_2$ levels reach 600 ppm, and 60% when $CO_2$ levels reach 800 ppm. Similarly, ventilation system 102 may be configured to partially close vents when $CO_2$ levels decrease to lower values. When ventilation system 102 automatically affects a ventilation action, e.g., due to a change in $CO_2$ levels, ventilation system 102 may send data to server computer 120 indicating the $CO_2$ levels, previous ventilation levels, and the ventilation action taken. According to various embodiments, historical rates of $CO_2$ level change after ventilation actions of particular ventilation devices and/or at particular locations are tracked by server device 120. Based on this historical data, changes of $CO_2$ level for the particular ventilation devices and/or locations in response to ventilation actions may be predicted (e.g., using machine learning models 136 and/or using historical trend analysis techniques) and used to determine/predict the current functionality of a ventilation device (i.e., how well the device is functioning).

Other environmental metrics sent to server computer 120 may include temperature measurements, barometric pressure, particulate levels, and/or humidity levels. Ventilation system 102 may send the data to server computer 120 along a same interval as the $CO_2$ data and/or in other intervals. For example, temperature measurements may be sent once every ten minutes while $CO_2$ ppm levels are sent once every minute. Other environmental metrics may be provided by measuring devices in locations near a ventilation location. For example, a thermostat inside a classroom may provide temperature measurements for the classroom while a thermostat outside the classroom may provide outside air temperatures. Additionally or alternatively, other environmental metrics may be provided by outside sources. For example, server computer 120 may receive data from a publicly available data source comprising temperature, barometric pressure, humidity, particulate levels, and/or dew point estimates or measurements for a location corresponding to ventilation system 102.

At step 204 of process 200, server computer 120 tracks changes in $CO_2$ levels over time. Server computer 120 may store a series of entries, for each location, e.g., indicating a timestamp, a $CO_2$ level and one or more ventilation settings at the timestamp. Server computer 120 may additionally compute values indicating rates of changes in $CO_2$ levels during periods of rising $CO_2$ and/or $CO_2$. The computed change rates may be used to distinguish between different situations where a ventilation action is performed at a same $CO_2$ level. For example, if during a first period of time, the $CO_2$ levels rose at a rate of 50 ppm per hour prior to hitting a particular threshold and, during a second period of time, the $CO_2$ levels rose at a rate of 200 ppm per hour prior to hitting a particular threshold, a ventilation action would be expected to have a lesser effect when taken during the second period of time because the higher rate of $CO_2$ level change indicates that the location likely included a greater number of people during the second period of time than during the first period of time.

In various embodiments, the server computer 120 obtains one or more baseline estimates for $CO_2$ level changes for a location. For example, the server computer 120 may determine an average rise in $CO_2$ levels prior to a threshold value being reached, maximum and minimum rises in $CO_2$ levels prior to a threshold being reached, maximum, minimum, and average changes in $CO_2$ levels after ventilation actions are performed, and/or maximum, minimum, or average $CO_2$ levels during different times during the day. The baseline measurements allow the server computer 120 to identify expected values for a location so that anomalies can be easily detected, where the anomalies may be specific to a particular location. That is, different locations may have different baselines as a result of different physical and/or environmental characteristics at different locations. According to various embodiments, ventilation action rules may be based on baseline measurements for different locations.

In various embodiments, the server computer 120 determines responses to a ventilation action based on one or more factors. For example, the server computer 120 may compute a response to a ventilation action for a location based on one or more of a change in $CO_2$ levels prior to a ventilation action, a $CO_2$ level at the time of the ventilation action, a ventilation level prior to the ventilation action, a ventilation level after the ventilation action, an outside air temperature, an inside air temperature, a humidity, a particulate level, a barometric pressure, and/or a dewpoint. The response to ventilation may be computed independently for each of a plurality of factors and/or computed as a function of the factors together. For example, the server computer 120 may identify a plurality of situations where temperature, humidity, particulate levels, barometric pressure, and dew point were all the same, but a change in ventilation prior to a particular ventilation action varied. The server computer 120 may track a decrease in $CO_2$ levels for the plurality of situations and use the resultant values to compute a relationship between previous $CO_2$ changes and an effect of a ventilation action on $CO_2$ levels. Such results may be used to perform location-specific adjustments to settings for future ventilation actions at the location.

3.3 Measurement Display

At step 206 of process 200, server computer 120 generates and causes display of a graphical user interface depicting $CO_2$ levels and/or changes. The displays may depict, for a particular location, $CO_2$ levels before and after a ventilation action, rates of increase or decrease of $CO_2$, effectiveness of ventilation on $CO_2$ levels, relationships between $CO_2$ decreases and other environmental metrics, and/or other displays which provide insight into $CO_2$ levels at the particular location. Furthermore, a display generated by server computer 120 may correlate one or more points of data gathered over time for each of a plurality of ventilation devices and/or summary data for multiple devices at each site of multiple sites. Such correlation displays allows comparison of ventilation functionality over time.

The displays described herein provide graphical user interface improvements that allow a user to better manage ventilation devices in particular locations. In other embodiments, the displays provide functionality that can be directly applied to ventilation devices. For example, a display may include an option for creating and/or changing a ventilation schedule. Thus, if the display depicts a heavy increase in $CO_2$ levels, on average, at 4:00 pm in a particular location, an option to increase ventilation at or prior to 4:00 pm may allow a user to proactively change ventilation settings in response to the information, or to adjust ventilation rules to cause proactive ventilation actions based on trends shown in the display.

In various embodiments, the displays provide comparative information between two different locations. For example, a display may depict $CO_2$ levels over time at a plurality of locations using stacked bar graphs. By displaying $CO_2$ levels for different locations in a same display, the system provides stronger visual information relating to effects of ventilation in different locations. Comparative displays thus provide improvements over current systems as they provide clearer understanding of the differing effects of a same ventilation action in different locations. Such displays allow for better optimized configurations of ventilation settings based on a locational dependence of the effects of ventilation actions on environmental conditions in the ventilated spaces.

Figure 3:
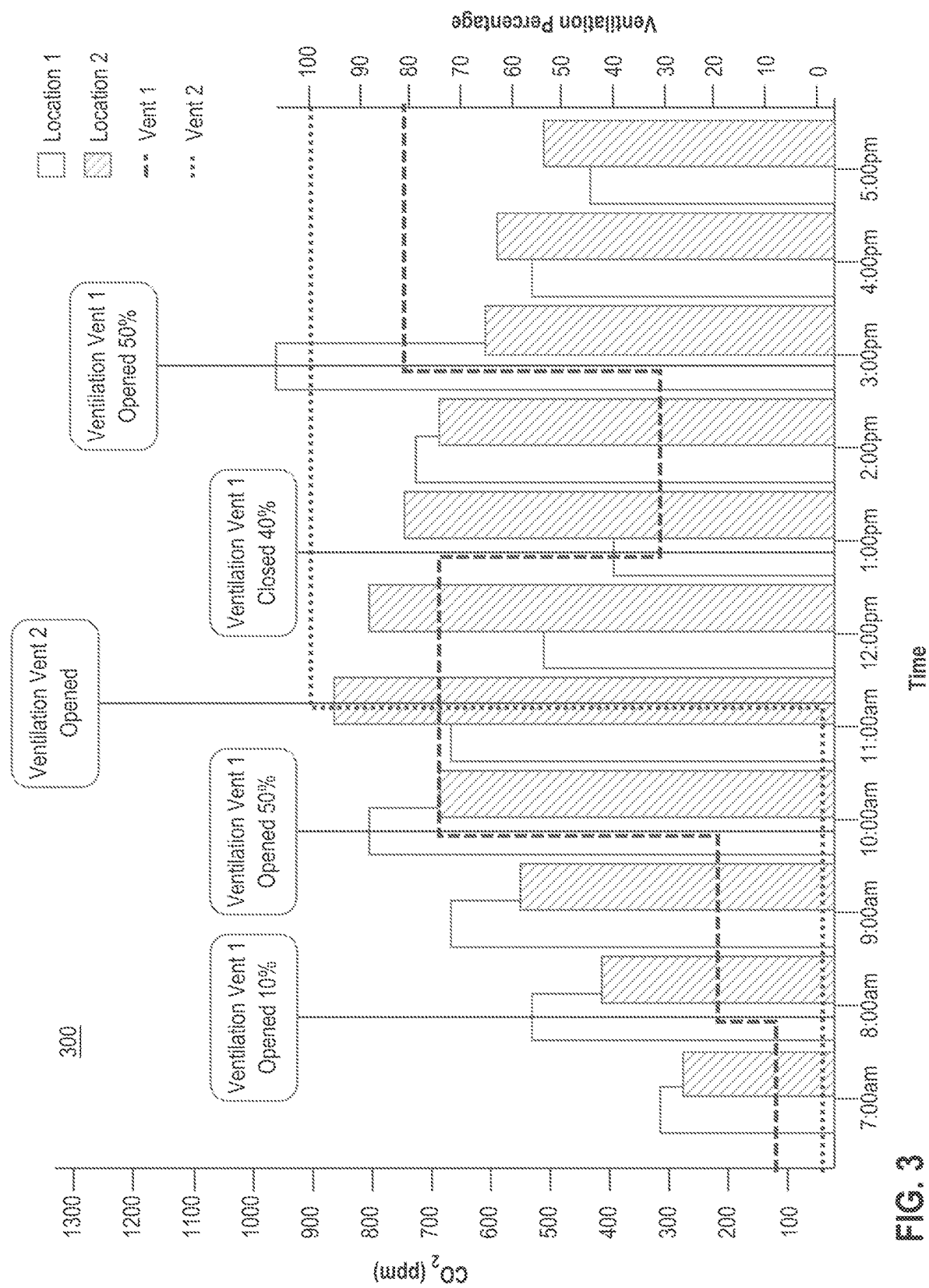
FIG. 3 depicts an example embodiment of a comparative display.

FIG. 3 depicts an example embodiment of a comparative display. Display 300 comprises a graph display of $CO_2$ levels for two locations over a plurality of temporal intervals. While display 300 depicts $CO_2$ levels using a histogram, other embodiments may use different displays, such as line charts, tables, or information summaries, or may display one or more other environmental metrics. The histogram of display 300 may be displayed in response to receiving a request to view a comparison of location 1 and location 2 over a set period of time. In embodiments, the displays may be configured based on user requests to include different and/or more locations, different periods of time, and/or additional data, such as ventilation data for each location at each point in time.

The histogram of display 300 comprises an x-axis depicting different times during a day and a y-axis depicting $CO_2$ levels in parts per million (ppm) and percentage of ventilation. The times may correspond to times when data is received from the ventilation system. Thus, if the ventilation system sends $CO_2$ data to the server computer 120 every hour, the display may depict hourly $CO_2$ levels. Other implementations may include smaller time intervals and/or batched data values. The histogram of display 300 includes representations of data for two different locations, thereby providing an easy comparison in $CO_2$ levels and the effects of ventilation actions. For example, in the first few hours of the day, $CO_2$ levels in location 1 appear to be rising at a faster rate than in location 2, indicating that the general airflow of location one may be worse than location 2 or that location 1 is more heavily populated than location 2. Display 300 further comprises a line graph indicating the percentage of ventilation of vent 1 and vent 2 over the represented time frame.

In various embodiments, the display additionally includes ventilation action information. For example, the histogram of FIG. 3 includes information depicting when ventilation vents in different locations were opened or closed. While being depicted as binary events, other embodiments may depict one or more particular ventilation settings along with when changes in the settings were implemented. By depicting the changes in ventilation, the histogram provides an easy visual comparison of the changes in $CO_2$ level that occurred in response to ventilation actions. For example, when ventilation vent 1 opened at 10:00 am, location 1 experienced a drastic reduction in $CO_2$ levels such that the ventilation vent could be closed again at 1:00 μm. In contrast, when ventilation vent 2 opened at 11:00 am, the $CO_2$ levels decreased much more slowly. The comparison thus allows a user to readily see that location 2 has a slower rise in $CO_2$ levels than location 1, but also a has a slower decrease in $CO_2$ levels when a vent is opened, which could be due to location 2 being a larger room than location 1.

While FIG. 3 is described as pertaining to a particular day, other embodiments may depict $CO_2$ averages over a different period of time, such as a week. By depicting average $CO_2$ levels, the server computer 120 provides insight into high-risk time periods and low-risk time periods. For example, if $CO_2$ levels tend to spike at 10:00 am for one location, but at 11:00 am for another location, a comparison display may provide an administrator with enough information to configure ventilation actions to occur prior to these times at each location, such as through portal 126 or directly through ventilation system 102.

The generated displays described herein provide visual information in a manner that was previously unavailable for the monitoring of $CO_2$ levels in a plurality of locations. Such displays can be invaluable to not only understand peak usage times, but to understand the different ventilation capabilities of ventilation devices in different locations. Such analytics, for instance, can depict the effects of ventilation devices in different locations such that ventilation settings can be strategically adjusted to achieve target environmental metrics levels in the various locations.

3.4 Ventilation Problem Detection

Referring again to FIG. 2, problem detection process 220 provides a process by which ventilation devices can be monitored to determine if they are functioning optimally with respect to one or more optimization criteria, such as energy efficiency, ventilation effectiveness, or cost. Systems that automatically activate ventilation devices (via one or more ventilation actions) when triggered may still fail to maintain environmental conditions at optimum levels (such as keeping $CO_2$ levels at or below a triggering threshold) if the ventilation device is not functioning optimally. By performing problem detection process 220, the systems and methods described herein provide real-time notifications for problems with ventilation devices, allowing issues to be resolved before harm can be caused. While FIG. 2 describes a method that is performed when ventilation actions are automatically performed, similar methods may be performed when the server computer 120 receives any indication that a ventilation action was performed, such as a user request for a ventilation action.

At step 208 of process 220, ventilation system 102 determines that $CO_2$ levels exceed a threshold value (a "triggering" threshold) and, in response, perform a ventilation action. The threshold value may be pre-configured at the ventilation system 102 or server computer 120. For example, a processor may be configured to compare $CO_2$ levels measured by a $CO_2$ sensor 106A to a stored threshold value and, in response to determining that the $CO_2$ levels exceed the stored threshold value, send instructions that cause the associated ventilation device 104A to perform a ventilation action, e.g., indicated in a ventilation rule associated with the stored threshold value. In various embodiments, different thresholds may be configured for different ventilation actions as indicated by different ventilation rules. For example, a first threshold value of 600 ppm may correspond to a ventilation action of opening (or increasing the opening of) a ventilation vent by 20% while a second threshold value of 800 ppm corresponds to a ventilation action of opening (or increasing the opening of) a ventilation vent by 40%. The ventilation action may include opening or widening an air vent, initiating spinning or increasing the speed of one or more fans, or otherwise operating a ventilation device to increase ventilation in a particular location.

At step 210 of process 220, ventilation system 102 sends $CO_2$ level measurements and an indication that a ventilation action occurred to the server computer 120. For example, the ventilation system 102 may send data identifying a ventilation action when the ventilation action occurs. The ventilation system 102 may additionally send data identifying a triggering condition that triggered the automatic ventilation action (e.g., $CO_2$ levels reaching or exceeding a triggering threshold). Additionally or alternatively, the ventilation system 102 may continuously or periodically send $CO_2$ level measurements to the server computer 120. The ventilation system 102 may continue sending data to server computer 120 identifying $CO_2$ levels for the location corresponding to the ventilation device.

At step 212 of process 220, the server computer 120 determines, from changes in the $CO_2$ levels, that the ventilation device is not functioning optimally. Whether a ventilation device is functioning optimally or not comprises a configurable determination made by the server computer 120 and may refer to a ventilation device that is not working at all, or a ventilation device that has decreased in effectiveness (e.g., based on missing an air filter, a vent blockage, etc.). As seen below in the sections below, whether a ventilation device is working optimally can be determined as a deviation from previous performance, a deviation from expected performance, or based on data gathered from sites where a device was identified as not working optimally through user input.

In various embodiments, the determination that a ventilation device is not functioning optimally is based on a deviation from stored changes in environmental metrics recorded in connection with taking a ventilation action for the device, or based on expected changes in environmental metrics for a particular ventilation action for the device. For example, the server computer 120 may compare decreases in $CO_2$ levels, resulting from ventilation actions configured to decrease $CO_2$ levels, over time. If the decrease in $CO_2$ levels diminishes over time, e.g., more than an optimality threshold, the server computer 120 may determine that the ventilation device is not functioning optimally. For example, at a first timestamp, the $CO_2$ level associated with a first ventilation device decreases by 100 ppm after opening a particular number of vents of the first ventilation device. At a second timestamp (e.g., one month later), the $CO_2$ level associated with the first ventilation device decreases by 75 ppm after opening the same number of vents of the first ventilation device. Server computer 120 maintains an optimality threshold of 25 ppm. Based on the delta between the amount that the $CO_2$ level decreased at the first timestamp and at the second timestamp (resulting from the same type of ventilation action) being at least 25 ppm, server computer 120 determines that the first ventilation device is not performing optimally. Such determinations may be based on additional environmental metrics. For example, changes in IAT, humidity, occupancy, etc., over time may affect whether changes in $CO_2$ level reduction in response to ventilation actions, over time, indicate reduction in ventilation device performance.

The stored optimality threshold value may be pre-configured and/or computed for a particular location using the methods described further herein in Section 3.4.1. As another example, the server computer 120 may use a machine learning system configured to determine if a ventilation device is not operating optimally to compute a probability that a given ventilation device is not operating optimally, e.g., based on environmental metrics and ventilation data for the ventilation device. An example machine learning implementation is described further herein in Section 3.4.2.

At step 214 of process 220, in response to determining that the ventilation device is not functioning optimally, the server computer 120 sends a notification to a client device, such as via email, telephonic text message, automated telephone message, voice mail, a push notification at client device 140, an alert via an application or GUI displayed at client device 140, etc. For example, the server computer 120 may cause display of a warning on client device 140, e.g., via a GUI of portal 126, indicating that a ventilation device of ventilation system 102 is not functioning optimally. This real-time warning allows a user to respond to failures in ventilation before the air in the location becomes unhealthy to breathe.

3.4.1 Optimality Thresholds

In various embodiments, the server computer 120 computes optimality thresholds, for use in determining whether a ventilation device is performing optimally, for different locations based on tracked $CO_2$ levels. The criteria for computing optimality thresholds in such embodiments, and other embodiments, may be based on user configuration data. For example, a basic optimality threshold may be computed as being dependent on an average decrease in $CO_2$ levels (referred to as an "action-initiated $CO_2$ level decrease") after a ventilation action occurs. To further illustrate, based on user configuration data, an optimality threshold for a given location may be computed as being two standard deviations below the average action-initiated $CO_2$ level decrease computed from action-initiated $CO_2$ level decreases recorded in historical data for a previous time period (e.g., the previous two weeks, the previous five months, etc.). Thus, the optimality threshold for a location that experiences lower action-initiated $CO_2$ level decreases on average may be lower than the optimality threshold for a location that experiences a higher action-initiated $CO_2$ level decreases on average.

In various embodiments, the computation of an optimality threshold is based on a $CO_2$ level and/or a rise in $CO_2$ levels prior to the ventilation action. For example, the server computer 120 may identify different categories for rises in $CO_2$ levels prior to a ventilation action. Each category may include a range of values, such as a low category comprising a range of 0 ppm/hr-100 ppm/hr, a medium category of 101 ppm/hr-200 ppm/hr, and a high category of 201 ppm/hr-300 ppm/hr. The server computer 120 may compute average action-initiated $CO_2$ level decreases, in historical data for a plurality of locations, for each of the above scenarios and use the average decreases to compute threshold values that are applied for the associated scenarios. Thus, in various embodiments where ventilation actions are performed in response to $CO_2$ levels reaching a particular triggering threshold, an optimality threshold after a low rise in $CO_2$ levels may be higher than an optimality threshold after a high rise in $CO_2$ levels.

Another example may include parameterizing an equation that relates a given action-initiated $CO_2$ level decrease to a previous rise in $CO_2$ levels for the ventilation action, such as $d = a - br$ where d is the expected action-initiated $CO_2$ level decrease (e.g., based on historical action-initiated $CO_2$ level decrease data for the particular location), r is rise in $CO_2$ levels at the particular location prior to the ventilation action, and a and b are parameters that are computed using previous $CO_2$ measurements for the particular location. The parameters may be computed to minimize the difference between the expected action-initiated $CO_2$ level decrease and the actual action-initiated $CO_2$ level decrease for a plurality of instances of the ventilation action occurring as recorded in historical data. While the equation described herein is a linear equation, any equation can be used that can be parameterized using previous measurements of $CO_2$ levels.

In various embodiments, an optimality threshold is computed based on one or more other factors. For example, an optimality threshold may be computed based on other environmental metrics, such as temperature, barometric, pressure, humidity, particulate levels, and/or dew point. The factors may be parameterized based on previous data, such as is described with respect to the $CO_2$ levels above, computed independently as a factor-based dependence of decrease in $CO_2$ levels, or used as inputs for a machine learning implementation.

3.4.2 Machine Learning Implementations

Furthermore, machine learning models 136 may be used to predict whether ventilation devices are performing optimally. Prediction of whether particular ventilation devices are functioning optimally, e.g., based on a multiple environmental metrics, allows for repair/replacement of devices that are most likely to be degrading in functionality, and decreases the chance of repairing or replacing a device that has reduced functionality because of environmental factors and not because of being degraded. For example, the training data set for a machine learning model 136 may be labeled to indicate data associated with systems that are operating sub-optimally. Using such training data, machine learning model(s) 136 may be trained to compute a probability that a ventilation device is not working based on environmental metrics associated with the ventilation device. An example one or more neural network or linear regression models may be trained, using input datasets for a plurality of ventilation devices comprising information for one or more environmental metrics, such as $CO_2$ levels, TAT, OAT, humidity, etc. The machine learning models may be trained to identify correlations between input values, and to output any kind of prediction, including predicted future performance of a ventilation device, predicted status of a ventilation device (e.g., current percentage of functionality), etc.

Thus, in various embodiments, an expected action-initiated $CO_2$ level decrease is computed using a machine learning system. For example, a machine learning system such as a linear regression model may be trained using historical datasets for a particular location and ventilation action. Thus, a first trained model 136 may correspond to opening the vents to 20% in response to $CO_2$ levels reaching a first triggering threshold value while a second trained model 136 corresponds to opening the vents to 40% in response to $CO_2$ levels reaching a second triggering threshold value. Additionally or alternatively, a single machine learning model 136 may correspond to multiple ventilation actions in a particular location where the type of ventilation action is an input into the machine learning model 136.

The training datasets may include, for example, multiple training data points, each including a historical increase in $CO_2$ values over a period of time (such as an hour) prior to a ventilation action as an input, and an associated action-initiated $CO_2$ level decrease over a period of time after the ventilation action (such as thirty minutes) as an output. Additional inputs may include one or more other environmental metrics such as a temperature within the location, a temperature outside the location, a barometric pressure, a humidity, a particulate level, a dew point, etc. In implementations where the machine learning model 136 is not generated for an action performed at a particular $CO_2$ level or for a particular action, inputs may additionally include a $CO_2$ level at the time of the ventilation action and/or the ventilation action that was performed. The training datasets may be generated by the server computer 120 from historical data gathered based on a plurality of instances of a ventilation device being activated in a particular location. After machine learning model(s) 136 are trained, the server computer 120 may use the machine learning model(s) 136 to determine an expected decrease in $CO_2$ levels when a ventilation action is performed, using measurement data received from the ventilation system 102 or an outside source. If the actual decrease in $CO_2$ levels is lower than the expected decrease by a particular optimality threshold, such as 100 ppm/hour, the server computer 120 may determine that the ventilation device is not functioning optimally.

In various embodiments, the machine learning system comprising one or more machine learning models 136 is generated to be applicable to a plurality of locations. Applicability to other locations can be created by incorporating location-based values for the other locations into the training datasets for the machine learning system. Examples of location-based values may include average action-initiated $CO_2$ level decreases for a location, average effect of previous rise in $CO_2$ on action-initiated $CO_2$ level decreases for a location, average ratio of temperature to action-initiated $CO_2$ level decreases for a location, average ratio of barometric pressure to action-initiated $CO_2$ level decreases for a location, average ratio of humidity to action-initiated $CO_2$ level decreases for a location, average ratio of dew point to action-initiated $CO_2$ level decreases for a location, and/or any other values that contribute to a ventilation effect at the location.

Another implementation may use one or more machine learning models 136 to compute a probability that a ventilation device is not working. For example, the server computer 120 may obtain datasets for a plurality of instances of ventilation actions with some corresponding to optimally-functioning ventilation devices and some corresponding to ventilation devices that are not functioning optimally. The server computer 120 may train one or more machine learning models 136, such as a logistic regression model, using any of the above-described inputs with the output comprising whether or not the ventilation device was functioning optimally. For example, a 1 may be ascribed to ventilation devices that were not functioning optimally while a 0 is ascribed to ventilation devices that were functioning optimally. Using the one or more machine learning models 136, the server computer 120 may compute a probability that the ventilation device is not functioning optimally. If the probability is greater than a threshold value, such as 80%, the server computer 120 may determine that the ventilation device is not functioning optimally.

3.4.3 Notifications and Actions

In various embodiments, server computer 120 is configured to send notifications to one or more client computing devices, such as such as via email, telephonic text message, automated telephone message, voice mail, a push notification at client device 140, an alert via an application or GUI displayed at client device 140, based on tracked ventilation data. Example notifications may include alerts in response to a determination that a ventilation device is not functioning optimally, warnings when $CO_2$ levels have reached a triggering/notification threshold value at a location, warnings when $CO_2$ levels are approaching a triggering threshold value at the location, warnings when $CO_2$ levels are rising at a rate that is greater than a threshold value, alerts when ventilation actions are performed, and/or any other alerts or notifications based on tracked environmental metrics or ventilation data.

In various embodiments, server computer 120 is configured to automatically cause performance of one or more ventilation actions at a particular location. The ventilation actions may include opening or closing ventilation vents, increasing or decreasing a current opening of ventilation vents, powering on or powering off a fan, increasing or decreasing a fan intensity, or other actions that increase or decrease ventilation in a location. Server computer 120 may be configured to cause performance of the ventilation actions in response to determining that $CO_2$ levels have reached a particular triggering threshold value, a rise in $CO_2$ levels have reached a particular threshold rate value, a particular time in the day has been reached, a determination has been made that a ventilation device is not operating optimally, or in response to other environmental metric threshold values, computations based on ventilation actions, tracked $CO_2$ levels, and/or other environmental metrics such as internal or external air temperature.

As a practical example, if a ventilation action of opening an air vent by 20% has reduced a rate of increase in $CO_2$ levels, but $CO_2$ levels are still rising, the server computer 120 may cause a second ventilation action of opening the air vent by another 20%. The instances when the server computer 120 causes performance of a ventilation action may be based on computations by the server computer 120 (e.g., using machine learning models 136 as described herein) and/or based on ventilation action rule configurations set by a user at a client computing device 140. For example, the server computer 120 may display an interface on the client computing device 140 depicting average $CO_2$ levels for a given location a plurality of times during the day along with options for increasing or decreasing ventilation at any of the times of day. The server computer 120 may receive input, via the interface, indicating user selection of an option to increase ventilation prior to a particular time of day and, in response, may store ventilation action rule data indicating that the server computer 120 is to cause the indicated ventilation action to occur prior to the indicated particular time of day.

As another example, a display provided by the server computer 120 at client device 140 may include an option to increase ventilation based on an increase in $CO_2$ levels with options to select a particular ventilation action and an $CO_2$ level increase which, when detected, causes performance of the indicated ventilation action. By allowing ventilation action rule configurations to be set based on increases in $CO_2$ levels (or other environmental metrics), the server computer 120 is able to provide more dynamic ventilation that can proactively decrease air quality problems. Furthermore, server computer 120 may offer preconditioning options, e.g., keyed to the time of day, to reduce periodic high $CO_2$ levels that may be identified using historical $CO_2$ level data and/or machine learning model(s) 136.

4.0 Ventilation Optimization

In various embodiments, the server computer 120 is configured to optimize ventilation for different locations. The optimization may include creating location-specific recommendations, providing options for ventilation configuration, automatically performing preemptive ventilation actions, and/or automatically balancing ventilation with one or more other factors. The ventilation optimization may be provided as a service and can be performed using different levels of configuration. For instance, in one implementation, the server computer 120 performs the optimization without receiving any configuration instructions from a client computing device 140. In a second implementation, the server computer 120 performs the optimization using basic limits set by a client computing device 140, such as a maximum $CO_2$ level and/or a minimum temperature. In a further implementation, the server computer 120 performs the optimization using user-generated rules based on any number of factors being tracked and/or computed by the server computer 120. In the more complex implementations, the server computer 120 may provide a graphical user interface including options for generating rules for ventilation actions.

4.1 Location-Specific Recommendations

In various embodiments, the server computer 120 uses tracked information for a ventilation device to make location-specific recommendations. For example, the server computer 120 may compute an average action-initiated $CO_2$ level decrease for a given location, an average effect of initial $CO_2$ levels on action-initiated $CO_2$ level decreases for the location, an average effect of a previous rise in $CO_2$ levels on action-initiated $CO_2$ level decreases for the location, an average dependence of action-initiated $CO_2$ level decreases for the location on one or more other environmental metrics such as humidity, particulate levels, temperature, pressure, or dew point, or other responses to ventilation at the location.

The server computer 120 may generate recommendations for configuration or notification settings based on the tracked data. Notification recommendations comprise recommendations for configuring notifications based on one or more factors. For example, the server computer 120 may recommend notifications be sent if a rise in $CO_2$ levels exceeds a triggering threshold value. For locations with weaker responses to ventilation actions, the server computer 120 may recommend the notification be sent at a lower triggering threshold value. Thus, the server computer 120 may recommend configurations of notifications that are particular to a given location's response to ventilation. As another example, if a particular location's response to ventilation is highly dependent on outside air temperature, the server computer 120 may recommend a triggering threshold value for setting a notification that is dependent on the outside air temperature for the location.

Configuration recommendations comprise recommendations for configuring performance of ventilation actions based on one or more factors. As an example, a configuration recommendation for a first location with high action-initiated $CO_2$ level decreases may be to perform ventilation actions at a higher-than-average triggering threshold $CO_2$ level, and a configuration recommendation for a second location with lower action-initiated $CO_2$ level decreases may be to perform ventilation actions at a lower-than-average triggering threshold $CO_2$ level. Thus, ventilation configuration thresholds may be recommended based on a location's specific responses to ventilation using tracked environmental metrics for the location. As another example, the types of ventilation actions may be configured based on a location's specific responses to ventilation actions. For instance, a ventilation action for a location with a weaker response to ventilation actions may include opening a vent to a greater degree than a ventilation action for a location with a stronger response to ventilation actions.

The configuration recommendations may additionally include temporally-based recommendations. For example, using statistical analysis and/or trained machine learning models, the server computer 120 may identify time periods with historical trends of increased $CO_2$ levels and/or historical trends for strong rises in $CO_2$ levels (such as having low recorded $CO_2$ levels on weekdays at a school cafeteria other than between 11 am-1 pm, during which $CO_2$ levels are significantly elevated). The server computer 120 may generate a recommendation or automatic action to start or increase ventilation levels prior to these peak time periods. In various embodiments, the server computer 120 identifies a time when $CO_2$ levels begin increasing prior to a spike in $CO_2$ levels and recommend a ventilation action at the time the $CO_2$ levels tend to begin increasing. By identifying times when $CO_2$ levels begin to rise, the server computer 120 can generate recommendations for ventilation configuration such that ventilation is performed prior to spikes in $CO_2$ levels. In various embodiments, the recommendations comprise recommendations for a user of the client computing device 140 to perform one or more actions. For example, the recommendations may include a recommendation for a user to manually change ventilation levels of a location or to configure a ventilation system at a location to automatically change ventilation levels at specific times.

For example, a template scheduling subsystem of ventilation control system 100 allows users to set ventilation ranges (e.g., comfort/quality ranges in a comfort profile) based on time of day, day of the week, or specific day (e.g., via a graphical display at client device 140). Also, enhancements can be added through the template scheduling subsystem to set ventilation values based on other ventilation values, for example, if a $CO_2$ level is greater the 500 PPM at 2 PM, set the ventilation aperture of an associated ventilation device to increase by 20%. Such explicit ventilation scheduling allows a user to preemptively adjust ventilation settings for known events, which may or may not be based on recommendations by server computer 120.

4.2 Ventilation Configuration

In various embodiments, the server computer 120 provides options for configuring ventilation actions based on one or more factors. The configurations may include maximum $CO_2$ settings, settings based on other environmental metrics, settings that vary by location, configurations generated from recommendation, settings based on time of day, or other ventilation configuration options, such as using the server computer 120 to determine minimum and maximum settings for a ventilation device during install, e.g., supported by a template scheduling subsystem of ventilation control system 100.

In various embodiments, the server computer 120 accepts input specifying a maximum $CO_2$ setting for a particular location. For example, the server computer 120 may provide a graphical user interface at a client computing device 140 with an option for specifying a value comprising a requested maximum $CO_2$ level for a given location. Based on tracked information for the location, the server computer 120 may determine ventilation actions to ensure that the location's $CO_2$ levels are maintained under the specified maximum value. For example, given tracked information for a location, the server computer 120 may model (e.g., using statistical analysis of historical data, using a trained machine learning model 136, etc.) an expected increase in $CO_2$ levels for the location based on a current increase in $CO_2$ levels and/or one or more other factors. The server computer 120 may additionally model an expected effect of different ventilation actions based on the current increase in $CO_2$ levels. Based on the model data, the server computer 120 may then select a ventilation action that would ensure that the ventilation levels remain under the specified maximum $CO_2$ level.

The modeling may be performed continuously or periodically as new information is received. Thus, if a ventilation action is initially selected, but new data indicates that the rise in $CO_2$ levels is greater or lesser than historical trends that have been previously computed, the server computer 120 may determine whether a different ventilation action would be required to achieve the target results.

In various embodiments, different configuration settings may be set for different locations of a plurality of locations. Specifically, site and/or device profile settings (such as comfort profiles described above) may include site/device-specific profiles that define default values for one or more of: temperature setpoints, ventilation opening percentage, clock settings, etc. For example, maximum $CO_2$ levels for an auditorium in a school may be set at a lower value than maximum $CO_2$ levels for a small classroom in the school. As another example, a configuration setting for the auditorium may include performing a ventilation action at a lower $CO_2$ level and/or at a lower rise in $CO_2$ levels than the configuration settings for the classroom. By providing a mechanism for setting different configuration values for different locations, the server computer 120 provides utility for over-ventilating some key locations or for recognizing differences in reactions to ventilation of different locations.

In various embodiments, the configurations described herein can be automatically set based on the recommendations described above. For example, a recommendation to configure a ventilation device in a particular location to perform a ventilation action at 4:00 pm may include an option to set the recommendation as a configuration for the particular location, and/or to apply the recommendation as a configuration for one or more other (similar) locations, which is provided to a user via a template scheduling subsystem of ventilation control system 100. In response to receiving a selection of the option to set the recommendation as a configuration for the particular location, the server computer 120 may set the configuration and cause performance of the ventilation action at 4:00 pm based on the stored configuration data. In response to receiving a selection of the option to set the recommendation as a configuration for other similar locations, the server computer 120 may set the configuration and cause performance of the ventilation action at 4:00 pm at one or more other similar locations, which may be identified based on explicit classification by a user or based on similar trends of historical information and/or similar responses to ventilation actions as the particular location associated with the recommendation.

Advantages of the configuration-based system described herein include that a user can set configurations separately for different devices at different locations based on recommendations and/or based on personal knowledge. For example, a school administrator can set configuration rules for increasing ventilation while school is in session. Additionally, if an event is known to be taking place at a future time, a user may access the system to configure special ventilation rules for the event, such as maximum $CO_2$ settings or ventilation actions to be performed at different rises in $CO_2$ levels.

4.3 Ventilation Balancing

In various embodiments, the server computer 120 provides options for optimizing ventilation configurations to balance one or more factors. Factors may include internal air temperature, energy expenditure, or other factors. The server computer 120 may display options for setting minimum/maximum values for other factors and/or for requesting minimization or maximization for the other factors.

As an example, the server computer 120 may display an option for specifying a comfortable temperature range, e.g., as part of a comfort profile, the settings of which are adjustable via a graphic display by a template scheduling subsystem of ventilation control system 100. The comfort settings provide comfort ranges for the various manageable values of the control system 100. As ventilation values are changed, control system 100 attempts to maintain the associated comfort settings within the indicated parameters, e.g., Inside Air Temperature: 74-68, and/or humidity: 20%-70%, etc. The server computer 120 may model a change in temperature from different ventilation actions and a change in $CO_2$ levels for different ventilation actions. The server computer 120 may select the ventilation actions that cause a desired decrease in $CO_2$ levels while maintaining temperatures within the requested range. As a practical example, two possible ventilation actions that cause a particular decrease in $CO_2$ levels may include opening the vents to 100% for thirty minutes and opening the vents to 20% for three hours. The server computer 120 may determine that the first option would decrease temperatures below the requested minimum temperature while the second option would keep temperatures within the requested range. Thus, the server computer 120 may select the second option. As another example, the server computer 120 may select from among multiple options for reducing $CO_2$ levels, an option that minimizes energy expenditure.

4.4 Ventilation Installation

The systems and methods described herein may additionally be employed to provide assistance during ventilation installation by automatically performing one or more ventilation tests based on one or more types of ventilation actions, and recording environmental condition responses to the various ventilation actions. For example, a server computer 120 may receive a request to generate minimum and maximum $CO_2$ values for a location, as minimum $CO_2$ levels may vary based on location. In response to the request, the server computer 120 may modulate ventilation settings and track changes in $CO_2$. Based on the modulations and tracked changes, the server computer 120 may recommend a minimum $CO_2$ level and/or a maximum $CO_2$ level for the ventilation device. As a practical example, the server computer 120 may cause the ventilation device to perform maximum ventilation for a short period of time and record the $CO_2$ levels after the short period of time as the minimum $CO_2$ value. The server computer 120 may cause the ventilation device to close for a short period of time and record the $CO_2$ levels after the short period of time as the maximum $CO_2$ value. Furthermore, environmental metrics and ventilation actions, over time, may be recorded in historical metric data, which is used for various configuration recommendations and fault detection as described herein, e.g., for training of machine learning model(s) 136.

Additionally or alternatively, the server computer 120 may recommend initial thresholds for ventilation actions based on a response of a location to ventilation actions during the install. For example, the server computer 120 may record a current $CO_2$ level, cause performance of a ventilation action, and track the decrease in $CO_2$ levels. Based on the decrease, the server computer 120 may recommend a particular ventilation action for a threshold value, such as opening the vent to 40% for locations with low action-initiated $CO_2$ level decreases and 20% for locations with high action-initiated $CO_2$ level decreases, and/or a particular threshold value for a ventilation action, such as 600 ppm for a location with high action-initiated $CO_2$ level decreases, but 400 ppm for a location with low action-initiated $CO_2$ level decreases.

4.5 Pre-Conditioning

Pre-conditioning may be used to prepare spaces prior to a stressor event that is likely to change environmental metrics such that the metrics will go outside of applicable comfort or quality ranges set for a target space. Such pre-conditioning may be vital for maintaining environmental metrics (such as $CO_2$ levels) within comfort or quality ranges during stressor events, such as times of high space population or extreme external air temperatures.

Examples of stressor events include planned electricity outages, planned load-shedding events, planned maintenance events, predicted or actual high or low OAT, times of high space population, etc. Stressor events may be scheduled by a user (e.g., through a template scheduling subsystem of ventilation system 100), may be detected based on external information such as weather forecast data (e.g., received from a third-party system via network 150), or may be predicted based on historical environmental metric data collected by ventilation system 100 using statistical analysis and/or machine learning models 136. Pre-conditioning may be performed via one or more pre-conditioning actions by ventilation system 102 prior to the stressor event, such as increasing or decreasing the target temperature of a thermostat for the target space, ventilation actions by one or more ventilation devices in the space, etc.

4.5.1 Machine Learning for Pre-Conditioning

Machine learning may be used to predict stressor events or to predict pre-conditioning actions to prepare for a planned or predicted stressor event. Using such machine learning-based predictions to precondition a space increases the likelihood of effective pre-conditioning actions and minimizes the chance of performing excess pre-conditioning actions (which wastes resources).

According to various embodiments, machine learning model(s) 136 are configured to predict the occurrence of stressor events. For example, a machine learning model 136 is trained to predict the occurrence of a stressor event using training data comprising one or more environmental metrics (including, if available, population density of the space, scheduled events, date, day of the week, time of day, and detected environmental metrics) that were recorded preceding, during, and/or after a historical stressor event, as well as one or more comfort and/or quality ranges that were exceeded during the historical stressor event. Server device 120 uses the trained machine learning model 136 to predict future stressor events. According to various embodiments, server device 120 automatically causes one or more pre-conditioning actions to be performed in connection with a predicted stressor event, and/or causes an alert to be issued for the predicted stressor event.

Furthermore, according to various embodiments, machine learning model(s) 136 are configured to predict pre-conditioning actions that may be used to pre-condition a target space in preparation for a scheduled or predicted stressor event. For example, a machine learning model 136 is trained to predict one or more pre-conditioning actions to prepare for a stressor event using training data comprising one or more environmental metrics that were recorded preceding, during, and/or after a historical stressor event, as well as the one or more comfort or quality ranges that were exceeded by the historical stressor event, and one or more actions (such as ventilation actions and/or conditioning actions) taken prior to the historical stressor event, and the timing of the one or more actions. Server device 120 uses the trained machine learning model 136 to predict one or more preconditioning actions to perform prior to the stressor event and timing for performing the pre-conditioning actions. According to various embodiments, server device 120 automatically causes the predicted one or more pre-conditioning actions to be performed according to the predicted timing in relation to a scheduled or predicted stressor event, and/or causes an alert to be issued recommending the predicted one or more pre-conditioning actions to be performed according to the predicted timing.

4.6 Machine-Learning Based Ventilation Action Selection

Machine learning model(s) 136 may also be used to predict how a particular ventilation action will affect one or more target environmental metrics at a target location. The input for the trained machine learning models may comprise a plurality of environmental metrics (e.g., including the one or more target environmental metrics), which allows the trained machine learning models to predict the effect that one or more current environmental metrics have on the one or more target environmental metrics.

The training datasets for machine learning models may be specific to a target location, or may be from multiple locations (e.g., with similar attributes (such as size, average population density, weather zone, climate zone, humidity, cooling degree day, heating degree day, data gathered during similar times of year), with varying attributes, etc.). For example, a machine learning model may be trained to predict how ventilation actions will affect $CO_2$ levels in a classroom based on training data gathered from all of the classrooms in a particular school over the period of three months. In this example, the training data includes a plurality of pre-action environmental metrics (such as $CO_2$ level, IAT, OAT, and humidity) and may include one or more ventilation data for the location (e.g., number of ventilation devices in the space, size of the ventilated space, current population of the space, etc.), as well as the ventilation action that was taken (such as opening a vent by 20%). The training data is labeled with a resulting change in the one or more target environmental metrics (e.g., the $CO_2$ level reading one minute after the action was taken, five minutes after the action was taken, and ten minutes after the action was taken).

Furthermore, training data used to train a particular may be from all buildings in a particular area, or based on training data gathered from a variety of locations. Configuration of values included in the input dataset can help the machine learning model to consume data from a wide variety of sources while being able to identify trends in the data that are applicable to a given situation. For example, when humidity levels are included in training datasets, then the affect of humidity on outcomes is considered by the machine learning model.

5.0 Hardware Overview

According to various embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
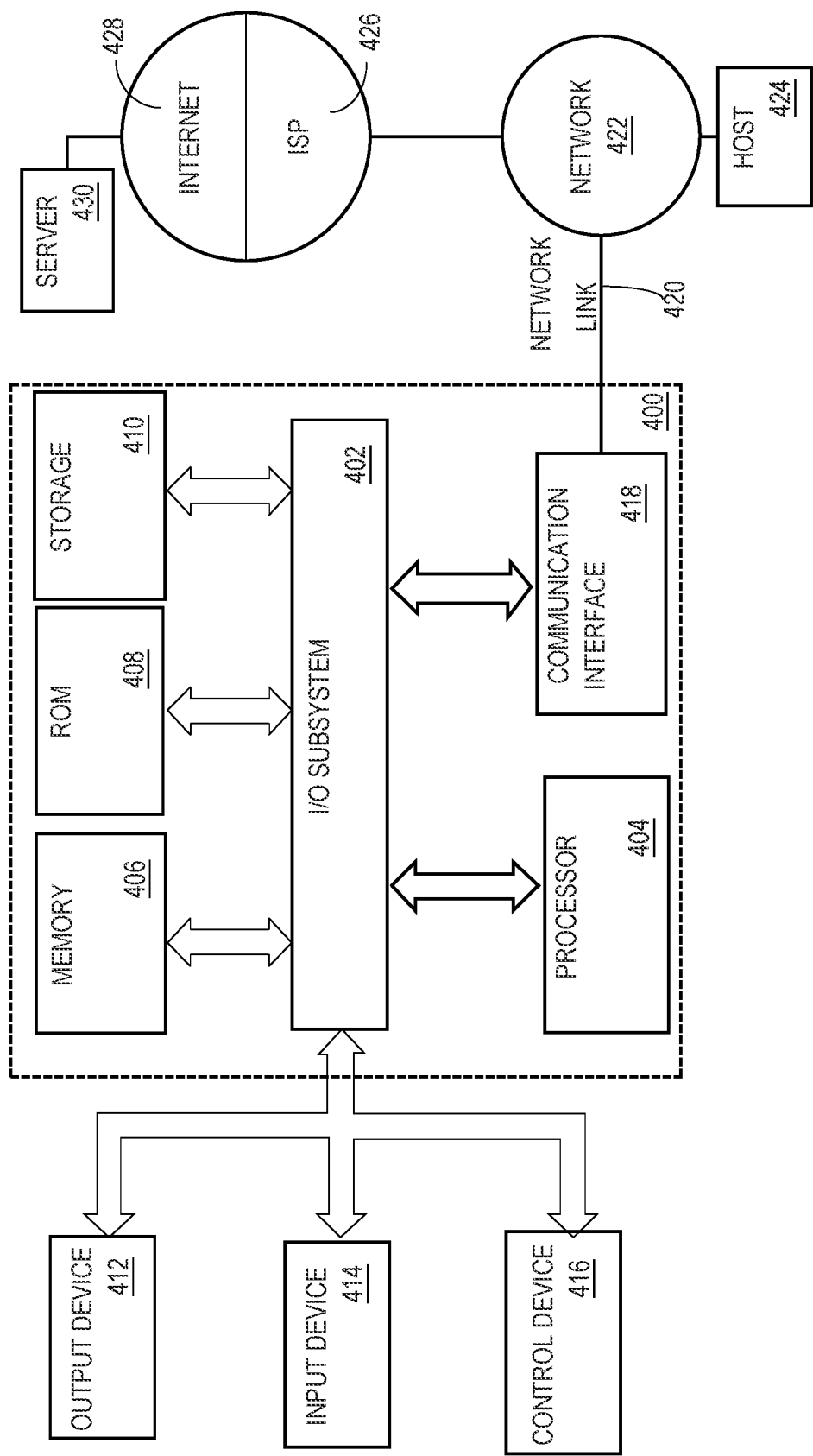
FIG. 4 is a block diagram that illustrates a computer system upon which various embodiments may be implemented.

For example, FIG. 4 is a block diagram that illustrates a computer system 400 upon which various embodiments may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to various embodiments, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method comprising:
    tracking $CO_2$ level changes measured for a plurality of locations over a plurality of intervals of time;
    based on the tracked $CO_2$ level changes measured for the plurality of locations, determining a ventilation action to perform at a particular location, of the plurality of locations, at a particular future time;
    sending one or more instructions to a ventilation device at the particular location that, when executed, cause the ventilation device to perform the ventilation action at the particular future time;
    determining, based on the tracked $CO_2$ level changes for the particular location over the plurality of intervals of time, that one or more particular intervals of time are associated with an average $CO_2$ level change that is greater than a stored threshold value for the particular location;
    in response to determining that the one or more particular intervals of time are associated with the average $CO_2$ level change that is greater than the stored threshold value for the particular location, determining a particular ventilation action to perform at a timestamp prior to the one or more particular intervals of time on a particular day; and
    causing a particular ventilation device at the particular location to perform the particular ventilation action at the timestamp on the particular day; wherein the method is performed by one or more computing devices.

2. The computer-implemented method of claim 1, further comprising:
    detecting that a second ventilation action has been performed by a second ventilation device at a second particular location at a second particular time;
    tracking a change in an environmental metric measured at the second particular location after the second ventilation action has been performed by the second ventilation device;
    wherein the environmental metric is based on one or more of:
        a carbon dioxide ($CO_2$) level,
        inside air temperature,
        outside air temperature,
        humidity,
        particulate levels,
        indoor air pressure,
        ventilation device fan speed,
        air speed,
        barometric pressure,
        time of day, or
        dew point;
    determining from the change in the environmental metric at the second particular location that the second ventilation device is not performing optimally based on one or more optimization criteria; and
    in response to determining that the second ventilation device is not performing optimally, sending a notification to a client computing device;
    wherein the method is performed by one or more computing devices.

3. The computer-implemented method of claim 2, wherein:
    the environmental metric is a $CO_2$ level; and
    the method further comprises:
        computing an optimality threshold value for the second particular location based on environmental metric data for the second particular location comprising one or more of:
            a $CO_2$ level,
            an inside air temperature,
            an outside air temperature,
            a barometric pressure,
            a humidity measurement,
            a particulate level, or
            a dew point;
        wherein the determining that the second ventilation device is not performing optimally comprises determining that the change in $CO_2$ level at the second particular location is less than the optimality threshold value.

4. The computer-implemented method of claim 2, wherein determining that the second ventilation device is not performing optimally comprises:
    using a trained machine learning model trained to output a prediction of whether the second ventilation device is performing optimally based, at least in part, on an action-initiated $CO_2$ level decrease at the second particular location after the second ventilation action, and one or more of:
        a change in $CO_2$ level at the second particular location before the second ventilation action was performed, or
        one or more environmental metrics comprising one or more of a $CO_2$ level, inside air temperature, outside air temperature, barometric pressure, humidity, particulate level, or dew point for the particular location when the second ventilation action was performed;
    wherein the determining that the second ventilation device is not performing optimally is performed in response to determining that a probability represented by the prediction is greater than a threshold value.

5. The computer-implemented method of claim 2, further comprising, in response to determining that the second ventilation device is not performing optimally, sending instructions to the second ventilation device that, when executed, cause the second ventilation device to perform a third ventilation action.

6. The computer-implemented method of claim 2, wherein said detecting is based on receiving data, over a network at a server computer, indicating that the second ventilation action has been performed.

7. The computer-implemented method of claim 1, wherein the plurality of intervals of time occurs over a plurality of days.

8. The computer-implemented method of claim 1, further comprising:
    storing $CO_2$ level change threshold values for the plurality of locations;
    determining, for the particular location, that a $CO_2$ level change is greater than a particular $CO_2$ level change threshold value for the particular location and, in response, determining the ventilation action to perform.

9. The computer-implemented method of claim 1, wherein determining the ventilation action to perform comprises using a trained machine learning model to predict the ventilation action based, at least in part, on input comprising: a maximum $CO_2$ level and one or more of a $CO_2$ level or a change in $CO_2$ level.

10. The computer-implemented method of claim 1, further comprising:
generating a graphical user interface comprising a comparison in $CO_2$ level changes for the plurality of locations over the plurality of intervals of time;
sending instructions to a client device which, when executed, cause the client device to display the graphical user interface.

11. One or more non-transitory computer-readable media storing one or more sequences of instructions that, when executed by one or more processors, cause:
tracking $CO_2$ level changes measured for a plurality of locations over a plurality of intervals of time;
based on the tracked $CO_2$ level changes measured for the plurality of locations, determining a ventilation action to perform at a particular location, of the plurality of locations, at a particular future time;
sending one or more instructions to a ventilation device at the particular location that, when executed, cause the ventilation device to perform the ventilation action at the particular future time;
determining, based on the tracked $CO_2$ level changes for the particular location over the plurality of intervals of time, that one or more particular intervals of time are associated with an average $CO_2$ level change that is greater than a stored threshold value for the particular location;
in response to determining that the one or more particular intervals of time are associated with the average $CO_2$ level change that is greater than the stored threshold value for the particular location, determining a particular ventilation action to perform at a timestamp prior to the one or more particular intervals of time on a particular day; and
causing a particular ventilation device at the particular location to perform the particular ventilation action at the timestamp on the particular day.

12. The one or more non-transitory computer-readable media of claim 11, wherein the instructions, when executed by the one or more processors, cause:
detecting that a second ventilation action has been performed by a second ventilation device at a second particular location at a second particular time;
tracking a change in an environmental metric measured at the second particular location after the second ventilation action has been performed by the second ventilation device;
wherein the environmental metric is based on one or more of:
a carbon dioxide ($CO_2$) level,
inside air temperature,
outside air temperature,
humidity,
particulate levels,
indoor air pressure,
ventilation device fan speed,
air speed,
barometric pressure,
time of day, or
dew point;
determining from the change in the environmental metric at the second particular location that the second ventilation device is not performing optimally based on one or more optimization criteria; and
in response to determining that the second ventilation device is not performing optimally, sending a notification to a client computing device.

13. The one or more non-transitory computer-readable media of claim 12, wherein:
the environmental metric is a $CO_2$ level; and
the instructions, when executed by the one or more processors, further cause:
computing an optimality threshold value for the second particular location based on environmental metric data for the second particular location comprising one or more of:
a $CO_2$ level,
an inside air temperature,
an outside air temperature,
a barometric pressure,
a humidity measurement,
a particulate level, or
a dew point;
wherein the determining that the second ventilation device is not performing optimally comprises determining that the change in $CO_2$ level at the second particular location is less than the optimality threshold value.

14. The one or more non-transitory computer-readable media of claim 12, wherein the determining that the second ventilation device is not performing optimally comprises:
using a trained machine learning model trained to output a prediction of whether the second ventilation device is performing optimally based, at least in part, on an action-initiated $CO_2$ level decrease at the second particular location after the second ventilation action, and one or more of:
a change in $CO_2$ level at the second particular location before the second ventilation action was performed, or
one or more environmental metrics comprising one or more of a $CO_2$ level, inside air temperature, outside air temperature, barometric pressure, humidity, particulate level, or dew point for the second particular location when the second ventilation action was performed;
wherein determining that the second ventilation device is not performing optimally is performed in response to determining that a probability represented by the prediction is greater than a threshold value.

15. The one or more non-transitory computer-readable media of claim 12, further comprising, in response to determining that the second ventilation device is not performing optimally, sending instructions to the second ventilation device that, when executed, cause the second ventilation device to perform a third ventilation action.

16. The one or more non-transitory computer-readable media of claim 12, wherein said detecting is based on receiving data, over a network at a server computer, indicating that the second ventilation action has been performed.

17. The one or more non-transitory computer-readable media of claim 11, further comprising:
storing $CO_2$ level change threshold values for the plurality of locations;
determining, for the particular location, that a $CO_2$ level change is greater than a particular $CO_2$ level change threshold value for the particular location and, in response, determining the ventilation action to perform.

18. The one or more non-transitory computer-readable media of claim 11, wherein determining the ventilation action to perform comprises using a trained machine learning model to predict the ventilation action based, at least in part, on input comprising: a maximum $CO_2$ level and one or more of a $CO_2$ level or a change in $CO_2$ level.

19. The one or more non-transitory computer-readable media of claim 11, further comprising:
- generating a graphical user interface comprising a comparison in $CO_2$ level changes for the plurality of locations over the plurality of intervals of time;
- sending instructions to a client device which, when executed, cause the client device to display the graphical user interface.

* * * * *